US006969035B2

(12) United States Patent
Leopold et al.

(10) Patent No.: US 6,969,035 B2
(45) Date of Patent: Nov. 29, 2005

(54) GLASS HOLDER

(75) Inventors: Gunter Leopold, Baiersbronn (DE); Ulf Bastian, Waldachtal (DE); Juergen Koerber, Sindelfingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/235,067

(22) Filed: Sep. 5, 2002

(65) Prior Publication Data
US 2003/0062458 A1    Apr. 3, 2003

(30) Foreign Application Priority Data
Sep. 6, 2001 (DE) ................................ 101 43 639

(51) Int. Cl.[7] .............................................. A47K 1/08
(52) U.S. Cl. .................................. 248/311.2; 224/926
(58) Field of Search ............................ 248/310, 311.2, 248/313, 316.1, 316.3, 154, 346.04, 526, 248/510, 229.11, 309.1; 224/926, 282

(56) References Cited

U.S. PATENT DOCUMENTS

| | | | | |
|---|---|---|---|---|
| 367,175 | A * | 7/1887 | Bachlott, Jr. ................. | 248/207 |
| 529,953 | A * | 11/1894 | Presnell ....................... | 248/310 |
| 1,161,762 | A * | 11/1915 | Bartlett ........................ | 248/310 |
| 1,174,700 | A * | 3/1916 | Eastman ....................... | 362/485 |
| 1,530,024 | A * | 3/1925 | Washburn ..................... | 30/436 |
| 2,497,194 | A * | 2/1950 | White .......................... | 248/500 |
| 2,871,615 | A * | 2/1959 | Borah ...................... | 248/346.11 |
| 2,963,256 | A * | 12/1960 | Borah ...................... | 248/346.04 |
| 3,049,137 | A * | 8/1962 | Cole ............................ | 134/152 |
| 3,058,714 | A * | 10/1962 | Oliver ......................... | 248/300 |
| 3,160,280 | A * | 12/1964 | Burch ....................... | 211/89.01 |
| 3,646,283 | A * | 2/1972 | Hansen ....................... | 200/5 EB |
| 3,917,202 | A * | 11/1975 | Reinwall et al. ........... | 248/68.1 |
| 3,931,946 | A * | 1/1976 | Soltysik ...................... | 248/68.1 |
| 4,511,072 | A * | 4/1985 | Owens ......................... | 224/549 |
| 4,676,471 | A * | 6/1987 | Moore ......................... | 248/526 |
| 4,693,440 | A * | 9/1987 | Lalonde ...................... | 248/154 |
| 4,792,184 | A * | 12/1988 | Lindberg et al. ........ | 297/188.16 |
| 4,969,618 | A * | 11/1990 | Thompson .................. | 248/152 |
| 5,505,516 | A * | 4/1996 | Spykerman et al. ..... | 248/311.2 |
| 5,673,893 | A * | 10/1997 | Klein .......................... | 248/525 |
| 5,782,448 | A * | 7/1998 | Withun et al. ............ | 248/311.2 |
| 5,791,618 | A * | 8/1998 | Lancaster ................. | 248/311.2 |
| 5,865,997 | A * | 2/1999 | Isaacs ......................... | 210/232 |
| 6,059,243 | A * | 5/2000 | Hikage et al. ........... | 248/311.2 |
| 6,409,136 | B1 * | 6/2002 | Weiss et al. .............. | 248/311.2 |
| 6,749,167 | B2 * | 6/2004 | Kaupp et al. ............. | 248/311.2 |
| 2002/0179796 | A1 * | 12/2002 | Kaupp et al. ............. | 248/311.2 |

FOREIGN PATENT DOCUMENTS

DE         303 185          11/1916
JP       59210777 A   *   11/1984

* cited by examiner

*Primary Examiner*—Ramon O Ramirez
(74) *Attorney, Agent, or Firm*—Crowell & Moring LLP

(57) ABSTRACT

A glass holder for glasses having a narrow neck and a wider base has a vertically movable stand element formed so that a base of a glass is placeable on the stand element, at least two movable holding-down devices which are spaced from one another and in a holding position engage over the base of a glass standing on the stand element, and in a removal position are moved outwards, and a locking mechanism which, when the stand element has been moved downwards locks the holding-down devices against movement from the holding position into the removal position.

1 Claim, 2 Drawing Sheets

GLASS HOLDER

BACKGROUND OF THE INVENTION

The present invention relates to a glass holder intended, in particular for glasses provided with a narrow neck and a wider base, for installation in a means for locomotion, for example a motor vehicle, aeroplane or ship.

It is believed to be advisable to further improve the existing holders for installation in the above mentioned locomotion means.

SUMMARY OF THE INVENTION

It is an object of the present invention to provide a glass holder which is an improvement of existing holders.

More particularly, it is an object of the invention to propose a glass holder that, in the event of acceleration in any direction (acceleration, braking, cornering) or of jolting, holds a glass having a narrow neck and a wider base in an upright position securely against tipping over.

The glass holder according to the invention has a vertically movable stand element, on which a base, usually of circular and plate-like shape, of a glass can be placed. The stand element is especially a circular disc, although it can also be in form of an annulus or of a three-point support for the base of the glass. The vertical direction, in which the stand element of the glass holder is movable, relates to the intended installation position of the glass holder, wherein the latter holds a glass placed on the stand element in an upright position and with the base of the glass oriented in a horizontal plane. Slight differences, that is to say a glass that is held tilting slightly to the side, are not of any significance and are to be included in the scope of protection.

The glass holder further has at least two holding-down devices, which are spaced apart from one another in the circumferential direction of the stand element or of a glass base placed thereon. When the glass holder has two holding-down devices, they are preferably arranged opposite one another. In the case of three of more holding-down devices, they can be arranged spaced apart from one another evenly or unevenly. The holding-down devices are so arranged that they hold the base of a glass placed on the stand element securely, preventing the glass from tipping over in any direction. The holding-down devices are so mounted that they are movable between a holding position and a removal position. In the holding position, the holding-down devices engage over the base of the glass standing on the stand element and hold the base on the stand element, thereby preventing the glass from tipping over. In order to remove the glass, the holding-down devices are moved out into a removal position until the base of the glass can be lifted out from between the holding-down devices.

In order to prevent a held glass from tipping over, the glass holder according to the invention has a locking mechanism, which locks the holding-down devices against movement from the holding position to the removal position once the stand element has been moved down. The reason for that is the following: in the event of acceleration, in any direction, of a locomotion means in which the glass holder is subjected, in a horizontal direction, to a force which it is possible to think of as being applied at the centre of gravity of the glass, including any liquid contained therein. That force in a horizontal or lateral direction applies a moment to the stem and the base of the glass. That moment presses down the base of the glass at part of its circumference and lifts up the base at a part of the base of the glass, the stand element of the glass holder is pressed down and the locking mechanism locks all the holding-down devices against movement from the holding position to the removal position. As a result, the base of the glass is, even at that part of the circumference where the moment acting on the glass is trying to lift up the base, held down by the holding-down device In order to prevent a held glass from tipping over, the glass holder according to the invention has a locking mechanism, which locks the holding-down devices against movement foom the holding position to the removal position once the stand element has been moved down. The reason for that is nthe following: in the event of acceleration, in any direction, of a locomotion means in which the glass holder is subject, in a horizontal direction, to a force which it is possible to think of as being applied at the centre of gravity of the glass, including any liquid contained therein. That force in a horizontal or lateral direction applies a moment to the stem and the base of the glass. That moment pressed down the base of the glass at part of its circumference and lifts up the base at a part of the base of the glass, the stand element of the glass holder is pressed down and the locking mechanism locks all the holding-down devices against movement from the holding position to the removal position. As a result, the base of the glass is, even at that part of that part of the circumference where the moment acting on the glass is trying to lift up the base, held down by the holding-down device or devices arranged near that part of the circumference, as a result of which the glass is held securely and does not tip over.

The glass holder according to the invention has the advantage that it is in principle suitable for holding any glasses in means of locomotion, provided that the glasses have a narrow neck and a wider base which can be at least approximately circular, over which the holding-down devices of the glass holder can engage. The locking mechanism functions automatically; no manual actuation of the locking mechanism is required.

In an embodiment of the invention, a pivotal mounting for the holding-down devices is provided, by means of which the holding-down devices are so mounted that they can pivot about notional axes extending tangentially to the stand element. The holding-down devices can be pivoted, upwards and outwards, from the holding position, in which they are located towards the inside, into the removal position. This embodiment of the invention enables the holding-down devices to be guided and mounted simply.

In an embodiment of the invention, a drive element is provided at the holding-down devices, which is acted upon by the base of a glass when the glass is placed on the stand element, moving the holding-down devices from the removal position into the holding position. The base of the glass can act upon the drive elements of the holding-down devices directly or indirectly, for example by way of the stand element. In this embodiment of the invention, the holding-down devices are automatically moved into the holding position when the glass is placed on the stand element. That has the advantage that a glass can be set down on the glass holder by hand and removed again and is held in the holding position securely against tipping over without any further manipulation of the glass holder.

In an embodiment of The invention, an over-center spring mechanism is provided for the holding-down devices. An over-center spring mechanism is understood to be a spring mechanism which holds the holding-down elements under spring bias both in the removal position and in the holding position. The over-center spring mechanism moves the holding-down devices, under spring force, in the direction of the removal position or of the holding position when the holding-down devices have passed a dead point in the direction of the position in question. A dead point is accordingly understood to mean a particular position of the holding-down devices between the removal and holding positions, in which position the over-center spring mechanism moves the holding-down devices neither in the one nor in the other direction. The over-center spring mechanism can act on the holding-down devices or on the stand element; an over-center spring mechanism can also be provided for The holding-down devices and for the stand element.

In another embodiment of the invention, a push-push interlock mechanism is provided, which holds the holding-down devices in the holding position. The push-push interlock mechanism acts preferably on the stand element and, by way thereof, indirectly on those holding-down devices. It is locked by pressing the stand element down and holds the stand element in the lowered position. By pressing down a little on the stand element beyond the interlock, the push-push interlock mechanism is unlocked again so that a glass held by the glass holder can be removed. Push-push interlock mechanisms are known per se to the person skilled in the art and in some cases are known as a cardioid interlock or cardioid control means.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

This invention is described below in greater detail with reference to an exemplary embodiment illustrated in the drawing, in which.

DESCRIPTION OF THE PREFERRED EMBODIMENTS

Figure 1:
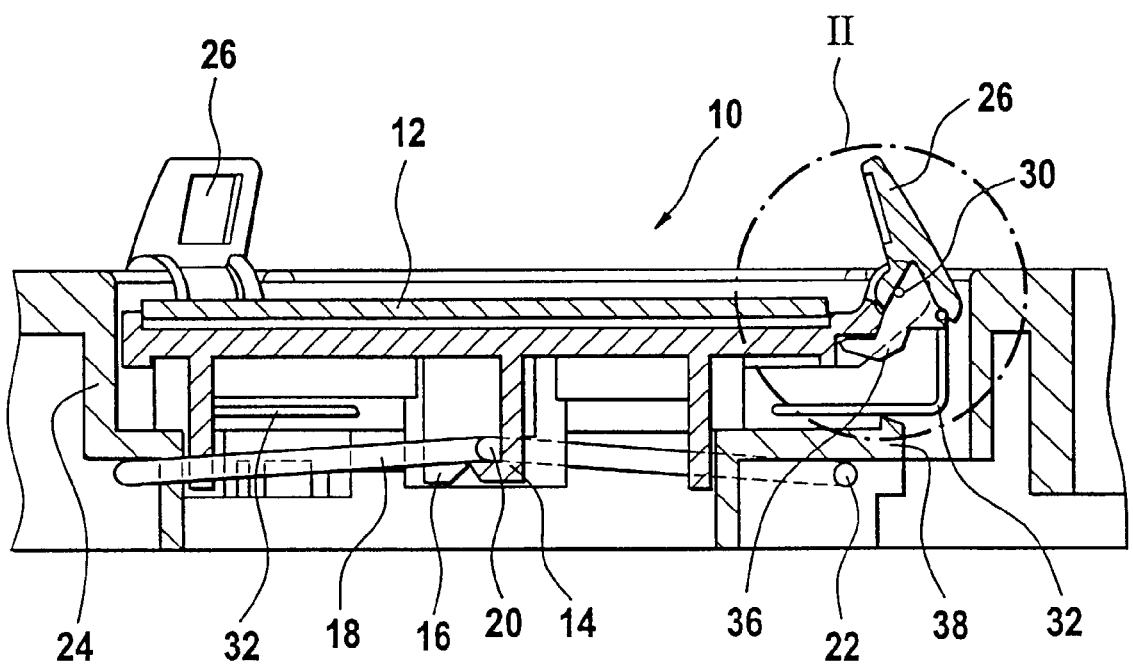
FIG. 1 is an axial section through a glass holder in a removal position.
Figure 5:
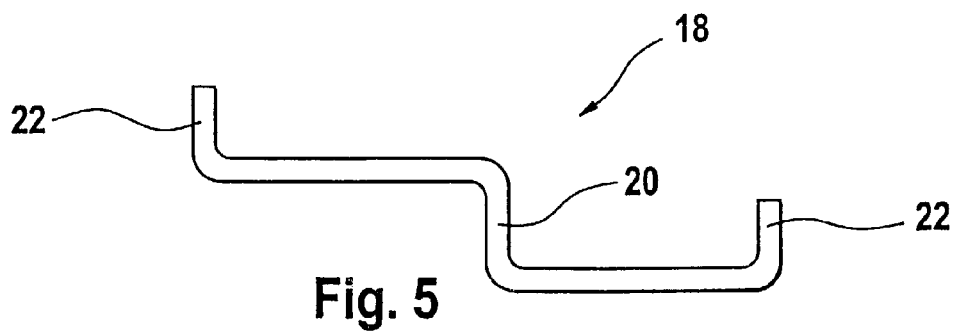
FIG. 5 shows a spring element of the glass holder of FIG. 1 as an isolated part.

The glass holder 10 according to the invention shown in FIG. 1 has a circular, horizontally arranged stand element 12, which is movable vertically, the positional references "horizontal" and "vertical" relating to an intended position of installation of the glass holder 10. In the middle, a hook 14, which is arranged between two rib-shaped counter-supports 16, projects from the underside of the stand element 12. Between the hook 14 and the counter-supports 16 there is fixed a bent spring element 18 made from spring wire (shown in top view in FIG. 5). The spring element 18 extends transversely beneath the stand element 12; in its centre it has a crank 20, which is produced by its being bent twice at right angles in opposite directions. The crank 20 is held between the hook 14 and the two counter-supports 16. The two ends 22 of the glass holder 10 are likewise bent at right angles and are fixed in a frame 24 of the glass holder 10. The spring element 18 ought to have been shown in section in FIG. 1 but for clarity of representation has been shown in a side view.

Figure 3:
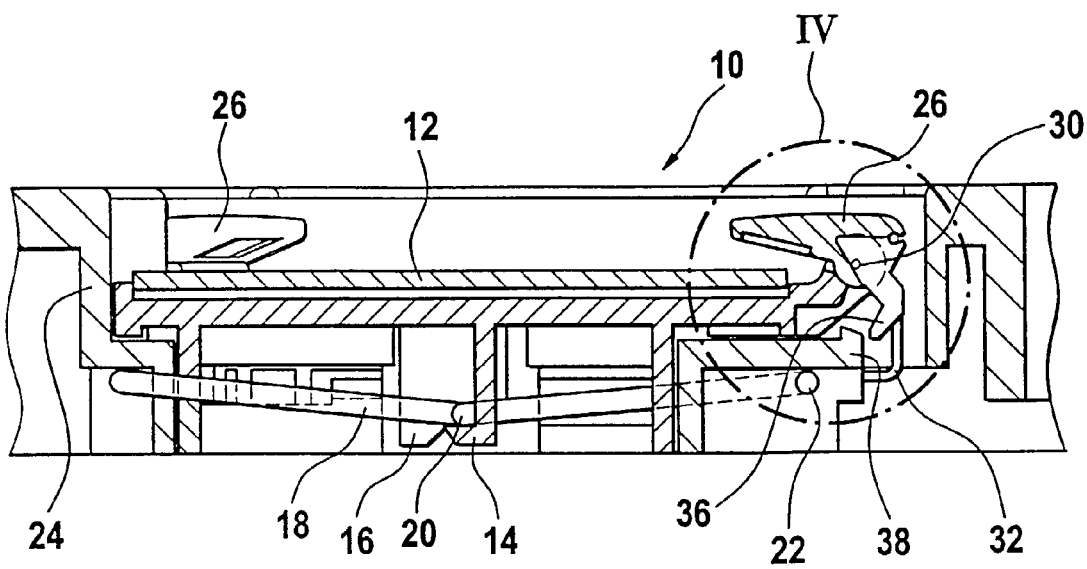
FIG. 3 shows the glass holder of FIG. 1 in a holding position.

The spacing at which the two ends 22 of the spring element 18 are held in the frame 24 is slightly shorter than the spring element 18 in its relaxed state. As a result, the spring element 18 can, by means of its crank 20, snap upwards as shown in FIG. 1 or downwards as shown in FIG. 3. The stand element 12 correspondingly moves together with the spring element 18 and is held by the spring element 18 in its respective end position. This is an over-centre spring mechanism, which moves the stand element 12 upwards or downwards into the end position, after a middle or neutral position (referred to as the dead point) has been passed, and holds it there.

Figure 2:
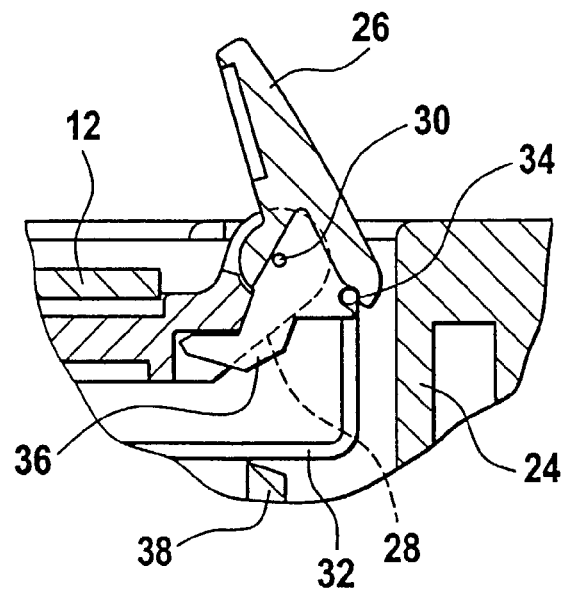
FIG. 2 shows an enlarged detail according to circle II in FIG. 1.
Figure 4:
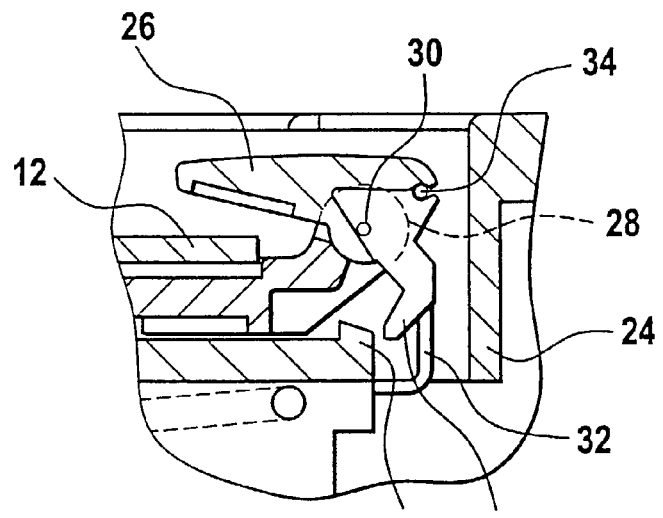
FIG. 4 shows an enlarged detail according to circle IV in FIG. 3.

Holding-down devices 26 are pivotally mounted at three locations on the circumference of the stand element 12. The holding-down devices 26 are in the form of a kind of flap; in a removal position shown in FIGS. 1 and 2, they are located at an upwards slant point inwards and, in a holding position shown in FIGS. 3 and 4, they are located approximately horizontal, pointing inwards over the stand element 12. In the holding position, the holding-down devices 26 are located above the stand element 12, spaced slightly away therefrom. The holding-down devices 26 can pivot about notional horizontal axes, which are tangential to the stand element 12. For the purpose of pivotally mounting the holding-down devices 26, two tongues 28, for each holding-down device 26, project out from the stand element 12, as indicated by the broken line in FIGS. 2 and 4. The tongues 28 are integral with the stand element 12, a tongue 28 being arranged at each side of each holding-down device 26. The tongues 28 have a hole, in which pivot pins 30 are rotatably located, which pins 30 project out from the holding-down devices 26 on both sides. The holding-down devices 26 can, as a result, pivot upwards into the removal position shown in FIGS. 1 and 2 and downwards into the holding position shown in FIGS. 3 and 4.

Each holding-down device 26 has an over-centre spring mechanism: for provision of the over-centre spring mechanism, for each holding-down device 26, a bent spring wire 32 is fixed to an underside of the and element 12. Each spring element 32 extends beneath the stand element 12 approximately radially outwards and, after bending through 90° in a radially outer region of the holding-down devices 26, upwards. An end 34 of each spring element 32 is bent over at a right angle horizontally and tangentially to the stand element 12 and is snapped into a hole in the holding-down device 26, which hole is keyhole-shaped in side view and open to the outside. The spring element 32 subjects the holding-down device 26 to a spring force directed radially inwards toward the stand element 12. When the holding-down devices 26 are in the pivoted-up, removal position shown in FIGS. 1 and 2, the point of action of the spring element 32 is located beneath their pivot axis, defined by the pivot pins 30, so that the spring element 32 holds the holding-down device 26 in the removal position with spring resilience. In the pivoted-down, holding position of the holding-down devices 26 shown in FIGS. 3 and 4, the point of action of the spring elements 32 is located above the pivot axis, defined by the pivot pins 30, of the holding-down device 26 so that the spring element 32 exerts a downwardly directed moment on the holding-down device 26 and holds it in the holding position with spring resilience. In an intermediate position (not shown) between the holding position and the removal position, the spring element 32 acts at the same level as the pivot axis of the holding-down device 26 and consequently exerts no moment on the holding-down device 26. That intermediate position is designated the dead point if the holding-down device 26 is moved up beyond the dead point, the spring element 32 pivots the holding-down device 26 up into the removal position; if the dead point is passed in a downwards direction, the spring element 32 pivots the holding-down device 26 down into the holding position. The spring element 32, in co-operation with the pivotal mounting of the holding-down devices 26, consequently forms an over-center spring mechanism.

A hook-shaped driving and locking element 36, which is integral with the holding-down device 26, projects down from each holding-down device 26. In the removal position shown in FIGS. 1 and 2, the hook-shaped driving and locking element 36 engages under the stand element 12; in the holding position shown in FIGS. 3 and 4, the driving and locking element 36 is located out to the side of the stand element 12 and also out to the side of a stop 38, which is fixed in the frame. When the stand element 12 is pushed down, it pushes the hook-shaped driving and locking element 36 down and out and, as a result, pivots the holding-down devices 26 from the removal position into the holding position. When, with the stand element 12 in the lowered, holding position, a holding-down device 26 is pivoted up, the driving and locking element 36 hits the stop 38 fixed in the frame, which prevents the holding-down device 26 from pivoting into the removal position. Pivoting of the holding-down devices 26 from the holding position into the removal position is only possible when the holding-down devices 26 are lifted together with the stand element 12 so far that the driving and locking elements 36 are located above the stops 38 and can pivot inwards above the stops 38.

The glass holder 12 according to the invention functions as follows: for holding a glass (not shown) having a plate-like base, the base of the glass is set down on the stand element 12 in the removal position and is pressed down together with the stand element 12. After the dead point of the spring element 18 fixed to the stand has been passed, the spring element 18 snaps down together with the stand element 12. The stand element 12 acts on the driving and locking elements 36 of the holding-down devices 26 and, in the manner described above, pivots the holding-down devices 26 down into the holding position shown in FIGS. 3 and 4. The holding-down devices 26 engage over the base of the glass and, as a result, hold the glass on the stand element 12.

If the glass is subjected to a horizontally acting force in any direction, for example as a result of acceleration, braking or cornering of a motor vehicle (not shown) in which the glass holder 10 is installed, which force can be thought of as acting at a centre of gravity of the glass, where applicable together with its contents, that force applies a moment to the stem of the glass, which moment presses down the base of the glass at part of its circumference and lifts it up at opposite part. As a result of the fact that the base of the glass is pressed down at part of its circumference, the stand element 12 of the glass holder is held down in the holding position. As a result, all the holding-down devices 26 are locked against pivoting up into the removal position because the driving and locking elements 36 are, in the case of a stand element 12 that is in the lower, holding position, lowered so far that they hit against the stops 38 when there is an attempt to pivot up the holding-down devices 26. As a result, the holding-down devices 26 hold the base of the glass down on the stand element 16 even at that part of the circumference where the force exerted by the glass in a horizontal or lateral direction is attempting to lift up the base of the glass. The glass is, as a result, held on the glass holder 10 securely against tipping over.

The only possibility for removal of the glass is for the glass to be lifted up. The glass base, over which the holding-down devices 26 engage in the holding position, lifts the stand element 12 uniformly at all the holding-down devices 26 until the driving and locking elements 36 are located above the stops 38 and can pivot inwards. On lifting the glass further, its base pivots the holding-down devices 26 beyond their dead points so that the spring element 32 pivots the holding-down devices 26 into the removal position. The base of the glass comes free as a result and the glass can be removed. When the stand element 12 is raised together with the glass, the spring element 18 of the stand element 12 snaps the stand element 12 up into the removal position.

Instead of the over-centre spring mechanism formed with the spring element 18, the stand element 12 can also be held in the lower, holding position by means of a push-push interlock mechanism, known per se, which is not shown in the drawing. Such a push-push interlock mechanism locks the stand element 12 in the holding position and is unlocked as a result of being pressed down a little, so that the stand element 12 can be lifted up for removal of the glass.

It will be understood that each of the elements described above, or two or more together, may also find a useful application in other types of constructions differing from the types described above.

While the invention has been illustrated and described as embodied in glass holder, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A glass holder for holding glasses having a narrow neck and a wider base, comprising:
   a vertically movable stand element;
   at least two movable holding-down devices; and
   a locking mechanism;
   wherein
      the movable stand element is formed to receive a base of a glass thereon, and is vertically displaceable between a glass holding position and a glass removal position,
      the locking mechanism is an over-center spring which biases the movable stand element in the holding and removal positions, and is engaged in the holding position by pushing the movable stand element downward and in the removal position by pulling the movable stand element upward,
      the movable holding-down devices are pivotally mounted on the movable stand element spaced from one another and engage over the base of the glass when the movable stand element is in the holding position with the glass thereon,
      as the movable stand element moves between the holding and removal positions, each movable holding-down device pivots about its respective movable stand element pivot and about a respective over-center pivot which is offset from the movable stand element pivot, and
   each movable holding-down device over-center pivot is an end of a respective holding-down device over-center pivot spring.

* * * * *